United States Patent
Kawalkar (10) Patent No.: US 8,791,913 B2
(45) Date of Patent: Jul. 29, 2014

(54) ADAPTIVE GESTURE RECOGNITION SYSTEM AND METHOD FOR UNSTABLE WORK ENVIRONMENTS

(75) Inventor: Amit Nishikant Kawalkar, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 302 days.

(21) Appl. No.: 13/359,312

(22) Filed: Jan. 26, 2012

(65) Prior Publication Data
US 2013/0194193 A1    Aug. 1, 2013

(51) Int. Cl.
*G06F 3/041*    (2006.01)

(52) U.S. Cl.
USPC ............ 345/173; 345/156; 345/158; 345/174

(58) Field of Classification Search
CPC ..... G06F 3/041; G06F 3/0418; G06F 3/0414; G06F 3/014; G06F 3/0346; G06F 3/03543; G06F 3/03549; B41J 19/202; B41J 2/16579; G01S 1/02
USPC ........ 345/173–183, 156, 158; 347/14, 19, 20, 347/5, 8, 9; 73/865.7; 244/185
See application file for complete search history.

(56) References Cited

U.S. PATENT DOCUMENTS

| | | | |
|---|---|---|---|
| 7,254,775 B2 | 8/2007 | Geaghan et al. | |
| 7,365,737 B2 | 4/2008 | Marvit et al. | |
| 7,907,838 B2 | 3/2011 | Nasiri et al. | |
| 2002/0050984 A1* | 5/2002 | Roberts | 345/173 |
| 2009/0201246 A1 | 8/2009 | Lee et al. | |
| 2010/0225595 A1 | 9/2010 | Hodges et al. | |
| 2010/0275166 A1* | 10/2010 | Jeon et al. | 715/863 |
| 2011/0050563 A1* | 3/2011 | Skutt | 345/156 |
| 2011/0171998 A1 | 7/2011 | Westerman | |
| 2011/0187651 A1 | 8/2011 | Whitlow et al. | |
| 2011/0242040 A1 | 10/2011 | Nutaro et al. | |
| 2011/0267280 A1 | 11/2011 | De Mers et al. | |

* cited by examiner

*Primary Examiner* — Kevin M Nguyen
*Assistant Examiner* — Kenneth B Lee, Jr.
(74) *Attorney, Agent, or Firm* — Ingrassia Fisher & Lorenz P.C.

(57) ABSTRACT

Methods and apparatus for correcting gesture-based input commands supplied by a user to a gesture-based touch screen display include using one or more sensors to detect that at least one of the touch screen display or the user is being subjected to an instability. Corrections to gesture-based input commands supplied to the touch screen display by the user are at least selectively supplied, in a processor, based upon the detected instability.

5 Claims, 13 Drawing Sheets

ADAPTIVE GESTURE RECOGNITION SYSTEM AND METHOD FOR UNSTABLE WORK ENVIRONMENTS

TECHNICAL FIELD

The present invention generally relates to gesture-based touch screen user interfaces, and more particularly relates to a gesture-based touch screen user interface that recognizes gesture-based input commands in unstable environments.

BACKGROUND

Touch screen display user interfaces that rely on gestural input from users (e.g., gesture-based touch screen user interfaces) are being used in a myriad of systems and environments. One of the motivations for using such interfaces is to offer an intuitive short cut to system functionality through physical gestures performed on the touch screen surface. Gesture-based touch screen user interfaces typically rely on a gesture recognizer to recognize gestural inputs supplied by a user, and appropriately supply corresponding commands to various control functions.

Generic gesture recognizers are based on machine learning theory. For a gesture recognizer to recognize gestural inputs, it has to be trained using a number of gestural input samples. This training process occurs in a stable environment, with the user at his/her normal physiological conditions, and with his/her primary task being supplying gestural inputs. Therefore, the gesture recognizer is trained to only recognize slight variations in gestural inputs.

In unstable vehicle platform environments, such as a flight deck during turbulence, vehicle instabilities coupled with physical and cognitive workload may prohibit a user from being able to correctly input desired gestures as expected or recognizable by a gesture recognizer that has not been trained under such conditions. The underlying gesture recognition process may thus invalidate/reject the input gesture. Even when the vehicle platform is not subjected to any instability, a user may be subjected to instability due to fatigue or increased workload during abnormal conditions, which may prohibit the user from supplying perfect gestural inputs. In addition to this, users themselves may exhibit instability via dithering motions in his/her hands during high-stress situations or due to health issues. Such motions in the hands could prevent the user from maintaining continuous contact with the touch screen, which could introduce irregularities and discontinuities.

A possible solution could be to extensively train a gesture recognizer in the actual turbulent or highly engaged and high workload environment. This solution could be costly, difficult, and involve risk in replicating such abnormal environment and operating situations. Also, the irregularities and discontinuities in the input gesture could vary dramatically and may have almost infinite permutations and combinations.

Hence, there is a need for a system and method of correcting irregularities and discontinuities in gesture-based input commands supplied to a gesture-based touch screen user interface that does not rely on replicating abnormal environments and operating situations and/or training based on numerous permutations and combinations. The present invention addresses at least this need.

BRIEF SUMMARY

In one embodiment, a method for correcting gesture-based input commands supplied by a user to a gesture-based touch screen display include using one or more sensors to detect that at least one of the touch screen display or the user is being subjected to an instability. Corrections to gesture-based input commands supplied to the touch screen display by the user are at least selectively supplied, in a processor, based upon the detected instability.

In another embodiment, a method for correcting gesture-based input commands supplied to a gesture-based touch screen display includes receiving, on the touch screen display, gesture-based input commands from a user. In a processor, corrections are at least selectively applied to the gesture-based input commands that are supplied to the touch screen display by the user.

In yet another embodiment, a gesture-based touch screen display system includes a touch screen display, an instability detector, and a processor. The touch screen display includes at least a touch sensitive region. The touch sensitive region is adapted to receive gesture-based input commands from a user and is configured, upon receipt of the gesture-based input commands, to generate gesture signals representative of the gesture-based input commands. The instability detector is configured to detect when at least one of the touch screen display or the user is being subjected to an instability and, upon such detection, to supply instability descriptors representative of the detected instability. The processor is coupled to receive the gesture signals and the instability descriptors and is configured, upon receipt of the gesture signals and the instability descriptors, to apply corrections to the gesture-based input commands based upon the instability descriptors.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
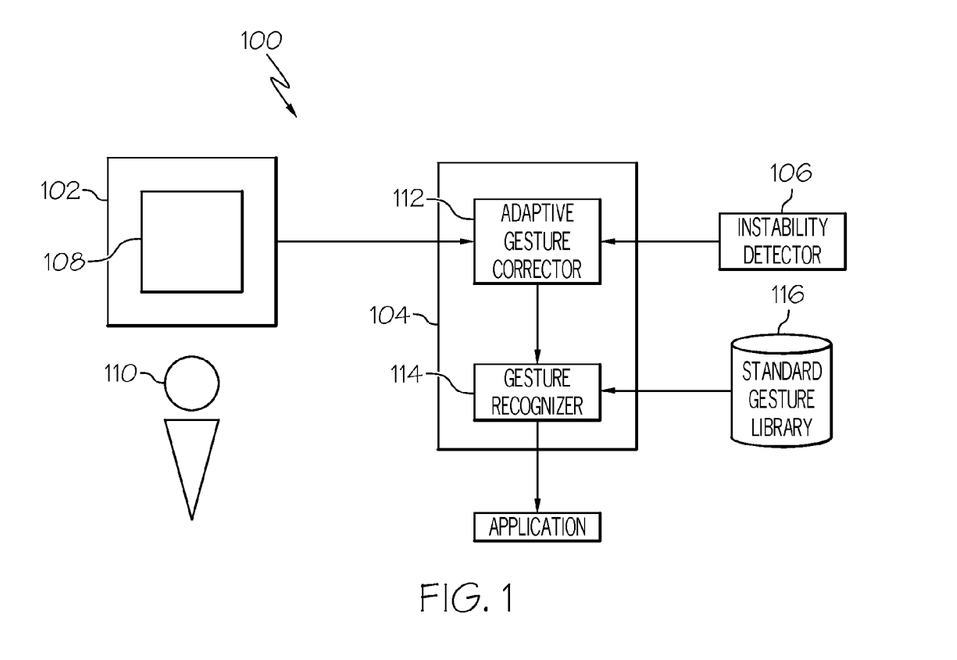
FIG. 1 depicts a functional block diagram of one embodiment of a system to correct irregularities and discontinuities in gesture-based input commands.

A block diagram of one embodiment of a gesture-based touch screen display system 100 is depicted in FIG. 1 and includes a touch screen display 102, a processor 104, and an instability detector 106. The touch screen display 102 includes at least a touch sensitive region 108 that is adapted to receive gesture-based input commands from a user 110 and is configured, upon receipt thereof, to generate real-time gesture signals representative of the gesture-based input commands. As is generally known, gesture-based input commands are commands that the user 110 inputs to a touch sensitive region of a display using one or more fingers. For example, a pinch-in gesture using two fingers (either on the same hand or on different hands) may correspond to a "zoom" command. As may be readily appreciated, the real-time gesture signals that the touch sensitive region 108 generates include data representative of both a gesture profile and a gesture direction. It will be appreciated that the touch screen display 102 may be implemented using any one of numerous touch screen displays configured to receive continuous touches from the user 110 that correspond to various gesture-based input commands.

As was previously noted, the user 110 may, in certain situations, be unable to supply correct gesture-based input commands that are recognizable by a generically trained gesture recognizer. As may thus be appreciated, when this occurs the real-time gesture signals that the touch sensitive region 108 generates will be representative of incorrect gesture-based commands. It should be noted that the term "incorrect gesture-based commands," as used herein, encompasses incomplete, inaccurate, and irregular gestures. Whether the gesture-based input commands supplied to the touch sensitive region 108 are correct gesture-based commands or incorrect gesture-based commands, the real-time gesture signals that result therefrom are supplied to the processor 104.

The processor 104 is coupled to receive the gesture signals generated by the touch screen display 102, and is additionally coupled to receive instability descriptors from the instability detector 106. The processor 104 is configured, upon receipt of the gesture signals and the instability descriptors, to selectively apply corrections to the gesture-based input commands, and to supply various signals that will, among other things, cause the system 100 to implement a command representative of the gesture-based input commands. The manner in which the processor 104 is configured to carry out this functionality will be described momentarily. Before doing so, however, the instability detector 106 will be described in more detail.

The instability detector 106 is configured to detect when at least one of the touch screen display 102 or the user 110 is being subjected to instability and, upon such detection, to supply instability descriptors representative of the detected instability. As used herein, the term "instability" encompasses accelerations the screen display 102 and/or user 110 may subjected to from, for example, turbulence, rough roads, or rough seas. This term also encompasses user-related instabilities caused by, for example, fatigue and/or increased workload during abnormal conditions, as well as dithering motions in a user's hands due, for example, to stress and/or health issues.

Figure 2:
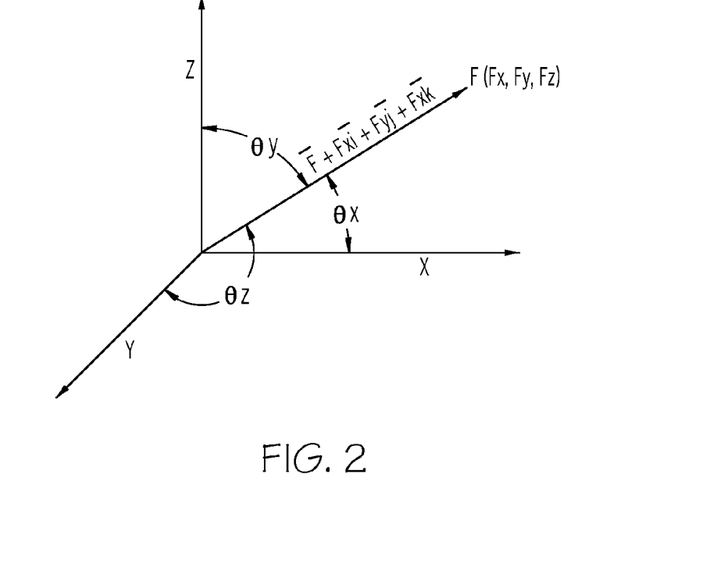
FIG. 2 depicts an example instability force vector that may be detected using the portion of the system of FIG. 1.

In the embodiment depicted FIGS. 2-20, the instability detector 106 is configured to detect when the touch screen display 102 is being subjected to sufficiently large accelerations and, if so, the corresponding effective directions of the accelerations. To do so, the instability detector 106 is configured to sense accelerations of the touch screen display 102 and supply acceleration signals representative thereof. The instability detector 106 may be implemented using any one of numerous types of detectors for sensing accelerations. As depicted in FIG. 2, the instability detector 106 is preferably implemented using one or more devices that sense accelerations along lateral, longitudinal, and vertical axes. As will be described further below, the instability detector 106 is additionally configured to generate and supply instability descriptors that correspond to the sensed accelerations. The instability descriptors, as was mentioned above, are supplied to the processor 104.

To carry out the functionality that was previously described, the processor 104 is further configured to implement an adaptive gesture corrector 112 and a gesture recognizer 114. The adaptive gesture corrector 112 receives the gesture signals from the touch screen display 102, and the instability descriptors from the instability detector 106. The adaptive gesture corrector 112 is configured, in response to the instability descriptors, to selectively apply corrections to the gesture-based input commands by correcting any irregularities and/or discontinuities in the gesture signals. The selectively corrected gesture-based input commands are supplied to the gesture recognizer 114.

The gesture recognizer 114 implements standard gesture recognition processes. More specifically, the gesture recognizer receives the corrected gesture-based input commands from the adaptive gesture corrector 112 and references a standard gesture library 116 to determine the correct gesture-based command. The standard gesture library 116 electronically stores a plurality of templates representative of standard gesture-based commands based on minimal training in static and normal operating conditions. The specific type and number of standard gesture-based commands may vary, and may be selected from any one of numerous known gesture libraries, a gesture library that is unique to the system 100, or a combination of both. It will be appreciated that although the standard gesture library 116 is, for clarity and convenience, depicted as being implemented in a storage structure that is separate from the processor 104, all or portions of the standard gesture library 116 could be integrally formed as part of the processor 104. The standard gesture library 116 could also be part of a device or system that is physically separate from the display system 100.

As will now be described in more detail, the instability detector 106 and the adaptive gesture corrector 112 together implement the above-mentioned adaptive gesture correction process, whereby the adaptive gesture corrector 112 selectively applies corrections to gesture-based input commands. The adaptive gesture correction process includes determining if the touch screen display 102 is being subjected to an instability above a preset threshold value and, if so, the corresponding direction of the instability. If it is determined that the touch screen display 102 is being subjected to such instability, the gesture-based input command is corrected.

Figure 3:
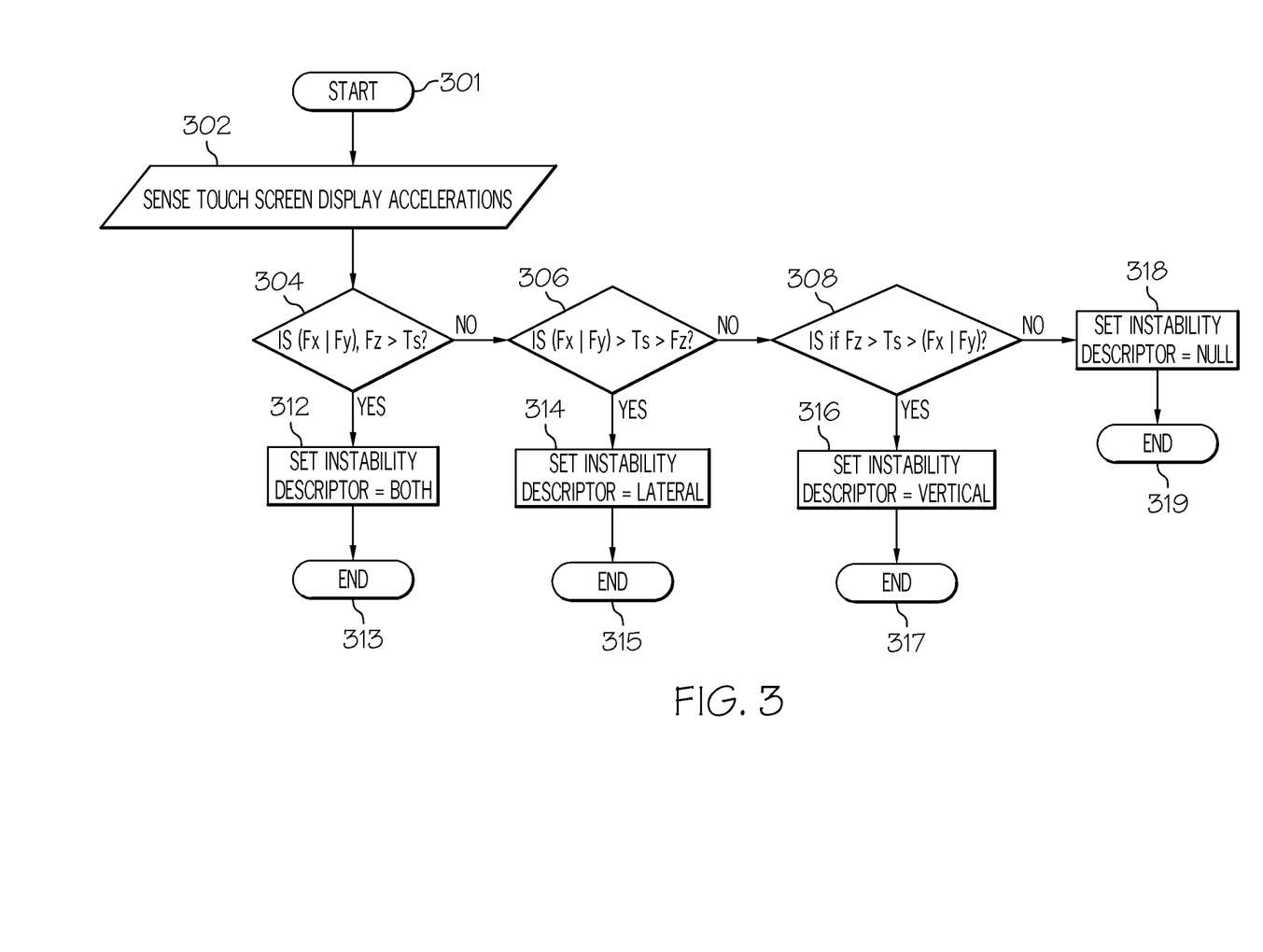
FIG. 3 depicts a process, in flowchart form, implemented by a portion of the system of FIG. 1 for computing instability descriptors.

More specifically, and with reference now to FIG. 3, the initial part of the adaptive gesture correction process is implemented by the instability detector 106. The instability detector 106, as was noted above, is configured, in addition to sensing touch screen display 102 accelerations (302), to generate and supply instability descriptors (312, 314, 326, 318) that correspond to the sensed accelerations. The instability detector 106 uses following criteria (302, 304, 306) to generate the instability descriptors (312, 314, 326, 318):

$(Fx|Fy) > Ts > Fz \rightarrow$ Lateral Only Instability (LATERAL);

$Fz > Ts > (Fx|Fy) \rightarrow$ Vertical Only Instability (VERTICAL);

$(Fx|Fy), Fz > Ts \rightarrow$ Combined Lateral and Vertical Instability (BOTH);

where Ts is a predetermined threshold force value. The value of Ts may vary, and is preferably determined during design, through simulations of the effect of vehicle platform and/or sensing touch screen display 102 accelerations on the user's 110 ability to specify correct and complete gestures. If none of the criteria are met, then the instability detector 106 generates and supplies a null instability descriptor (NULL) (318). The generated instability descriptors are supplied to the adaptive gesture corrector 112, which implements the remaining part of the adaptive gesture correction process.

Figure 4:
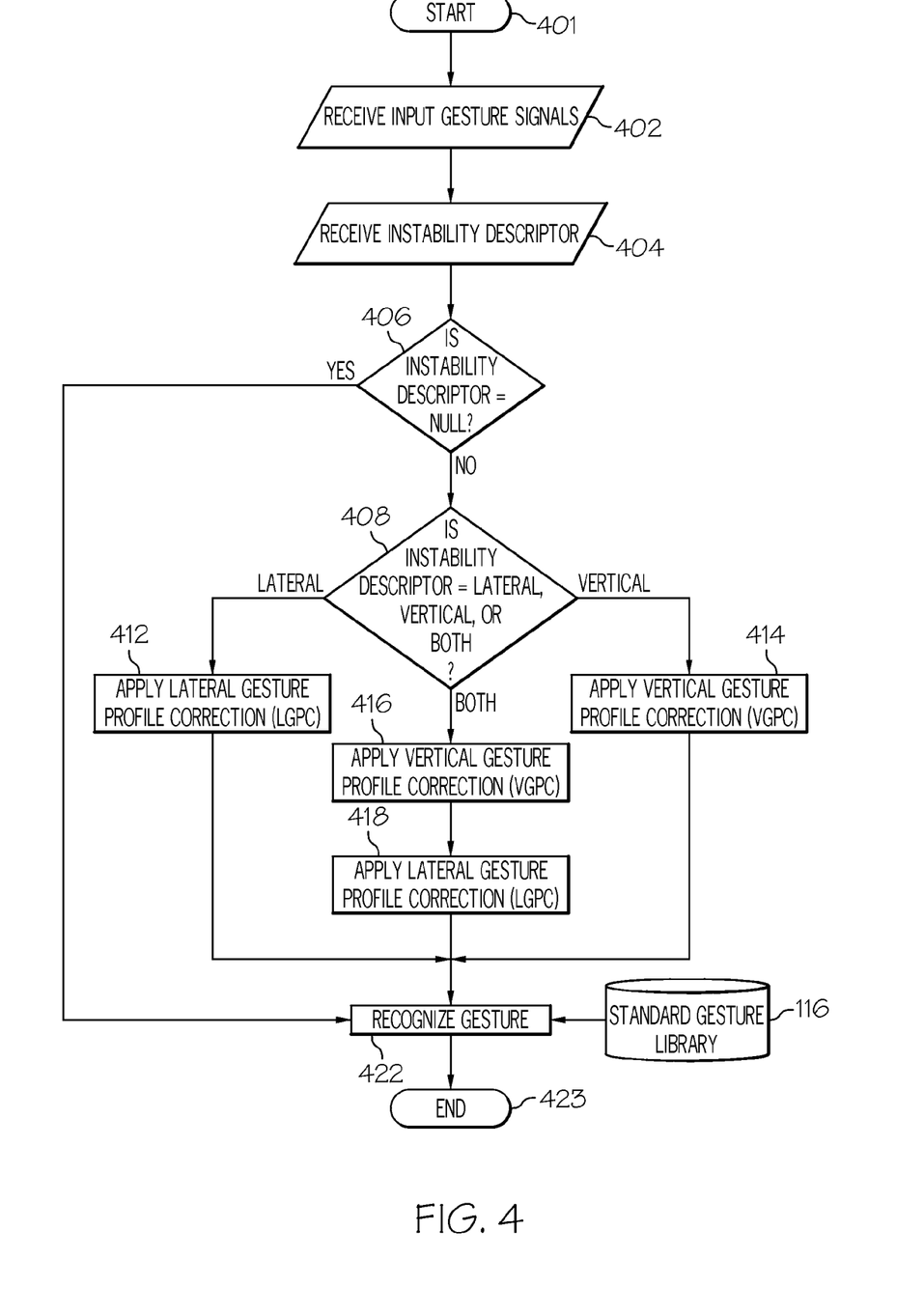
FIG. 4 depicts a process, in flowchart form, implemented by a portion of the system of FIG. 1 for implementing input gesture correction.
Figure 5:
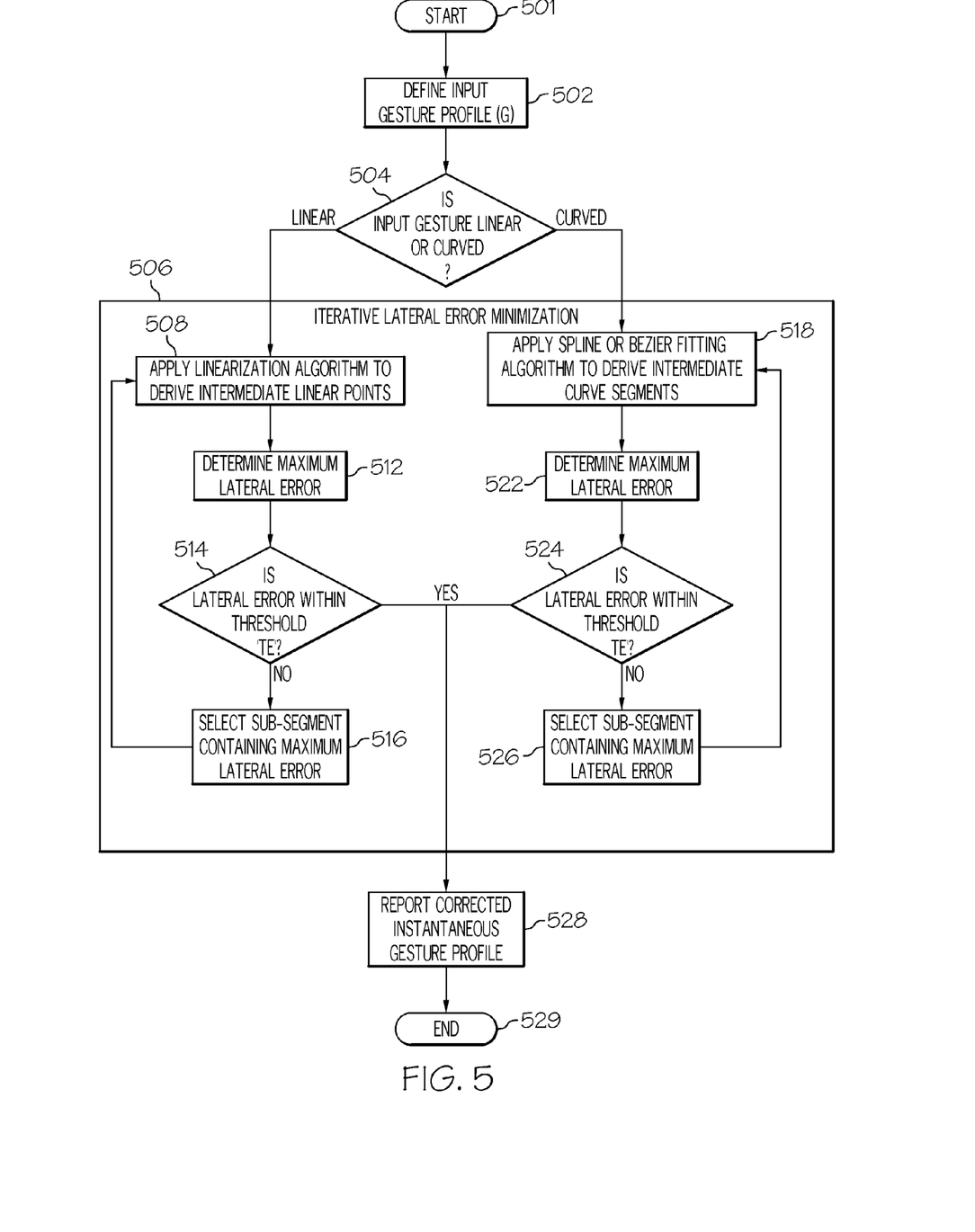
FIG. 5 depicts a process, in flowchart form, implemented by a portion of the system of FIG. 1 for implementing lateral gesture profile correction.

As depicted in FIG. 4, and as was described above, the adaptive gesture corrector 112 receives both the input gesture signals (402) and the instability descriptors (404). If the instability descriptor is NULL (406), meaning that there is no significant instability, the input gesture signal is sent directly to the gesture recognizer 114 (422). This ensures that the input gesture signals are not always passed through various detection, correction, and filtering processes, which optimizes algorithm performance and provides a better user experience during relatively calm conditions.

If the instability descriptor is any one of LATERAL, VERTICAL, or BOTH (408), then appropriate gesture correction is applied. More specifically, if the instability descriptor is LATERAL, then lateral gesture profile correction (LGPC) is applied (412). If the instability descriptor is VERTICAL, then vertical gesture profile correction (VGPC) is applied (414). If the instability descriptor is BOTH, then both LGPC (416) and VGPC (418) are applied. The LGPC and the VGPC processes will now be described in more detail.

Figure 6:
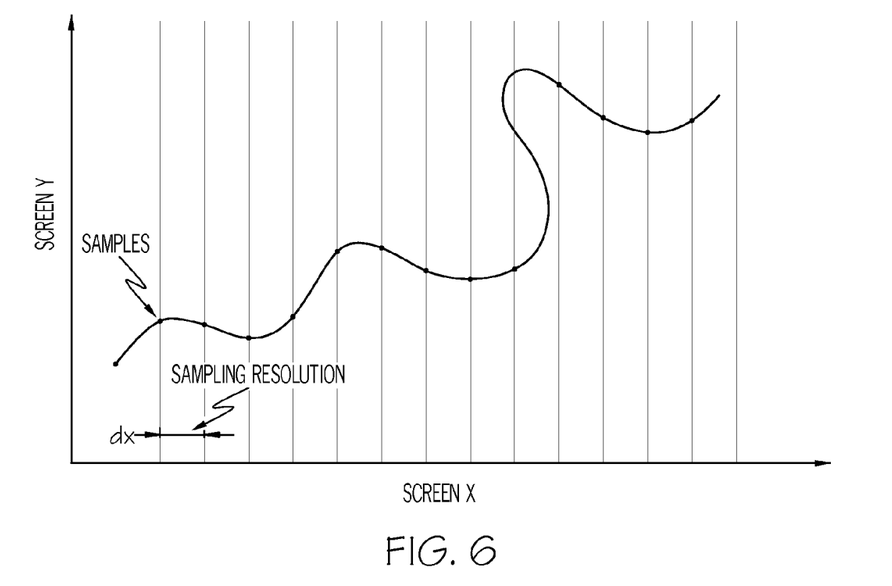
FIGS. 6 and 7 graphically depict a process for sampling different input gesture signals.
Figure 7:
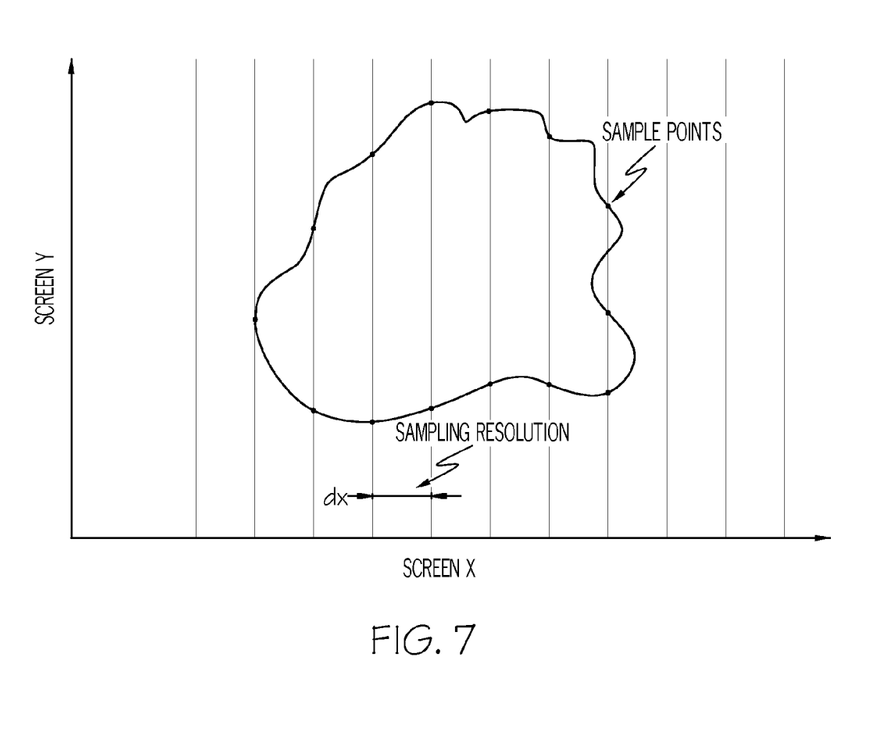

If the instability descriptor supplied from the instability detector 106 is LATERAL, then the adaptive gesture corrector 112 will implement LGPC to correct the input gesture signal caused by instabilities in either the lateral or longitudinal axis. To do so, and as shown more clearly in FIG. 5, the adaptive gesture corrector 112 first defines an input gesture profile (502). The adaptive gesture recognizer 112 does this by sampling the input gesture signal with a resolution (dx) along the x-axis of the touch sensitive region 108 to generate a plurality of discrete sample points. As shown below, and as depicted in FIGS. 6 and 7, these discrete sample points, which are stored for further processing, define an input gesture profile (G):

$G = \{P1, P2, P3, \ldots, Pn\},$ where P1, P2, P3, . . . , Pn are the discretely sampled points.

Figure 8:
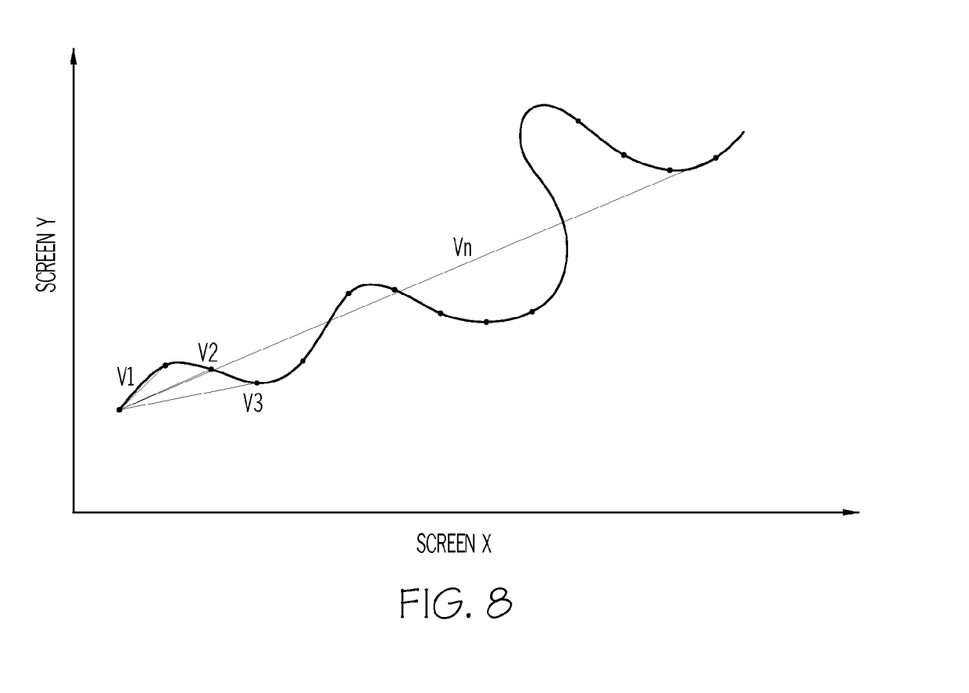
FIG. 8 graphically depicts a process for testing an input gesture profile for linearity.
Figure 9:
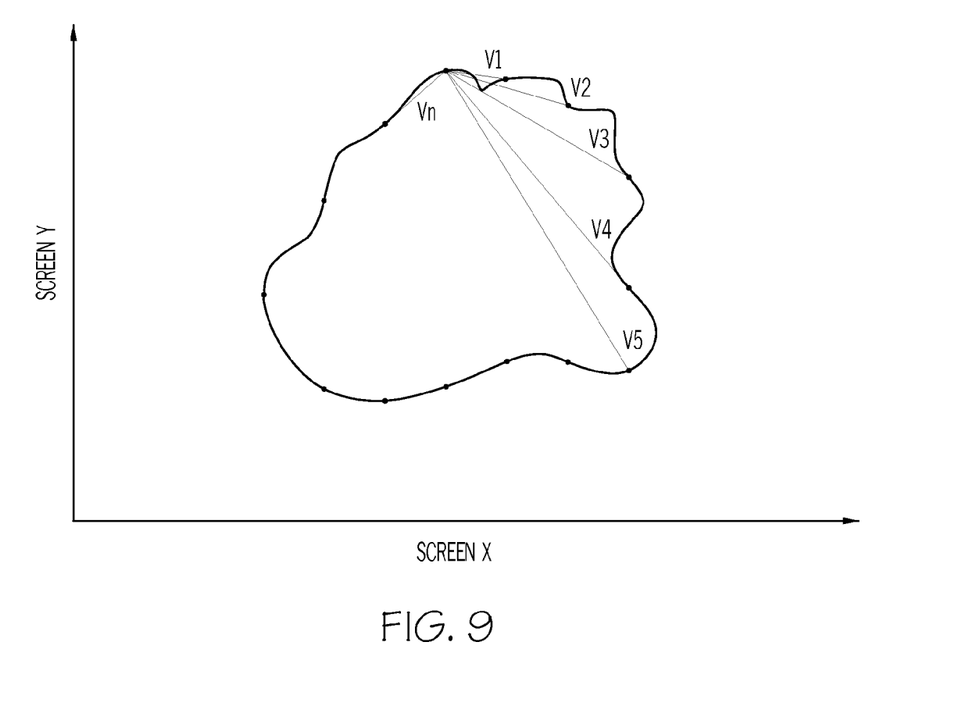
FIG. 9 graphically depicts a process for testing an input gesture profile for curvedness.

Returning once again to FIG. 5, after defining the input gesture profile (G), the adaptive gesture corrector 112 then determines if the input gesture profile represents either a generic linear gesture profile (LINEAR) or a generic curved gesture profile (CURVED) (504). To do so, the adaptive gesture corrector 112, as illustrated in FIGS. 8 and 9, computes the angles between consecutive vectors as follows:

$1 = AngleBetween(V2 \& V1)$ $2 = AngleBetween(V3 \& V2)$ $\vdots$ $n = AngleBetween(Vn \& Vn-1).$ The adaptive gesture corrector 112 then applies conditions for linearity of irregularly distributed samples and for curvedness of irregularly distributed samples to determine if the input gesture profile has generic linear characteristics or generic curved characteristics. More specifically, if the following condition is satisfied, the input gesture profile is determined to be LINEAR:

$$\frac{\left[\sum_{i=1}^{n}(\Theta_i - \Theta_{i-1})\right]}{n} \cong 0,$$

and if the following condition is satisfied, then the input gesture profile is determined to be CURVED:

$$\sum_{i=1}^{n}[(\Theta_i - \Theta_{i-1}) > 0] \geq 90°.$$

After determining whether the input gesture profile is LINEAR or CURVED (504), the adaptive gesture corrector 112 implements what is referred to herein as an iterative lateral error minimization process (506), whereby lateral errors in intermediately corrected gesture profiles are iteratively minimized. More specifically, and with reference once again to FIG. 5, if the instantaneous input gesture profile is found to be LINEAR, then intermediate samples are linearized to compute an intermediate gesture profile (508). If, however, the instantaneous input gesture profile is found to be CURVED, then any of the fast spline or Bezier fitting algorithms is applied to compute an intermediate gesture profile (518).

Figure 10:
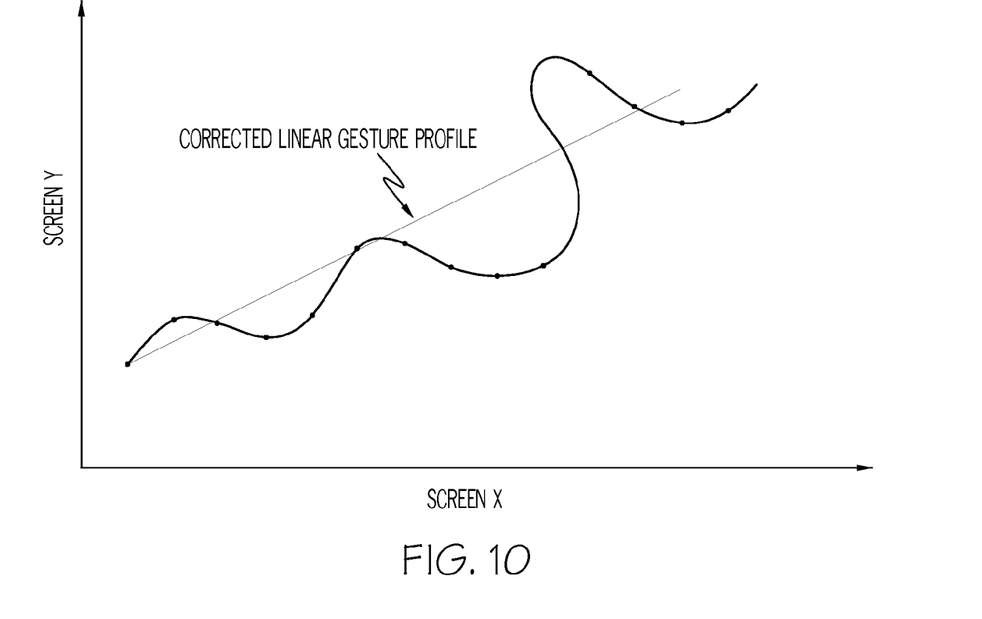
FIGS. 10 and 11 graphically depict the results of lateral gesture profile correction as applied to linear and curved input gestures, respectively.
Figure 11:
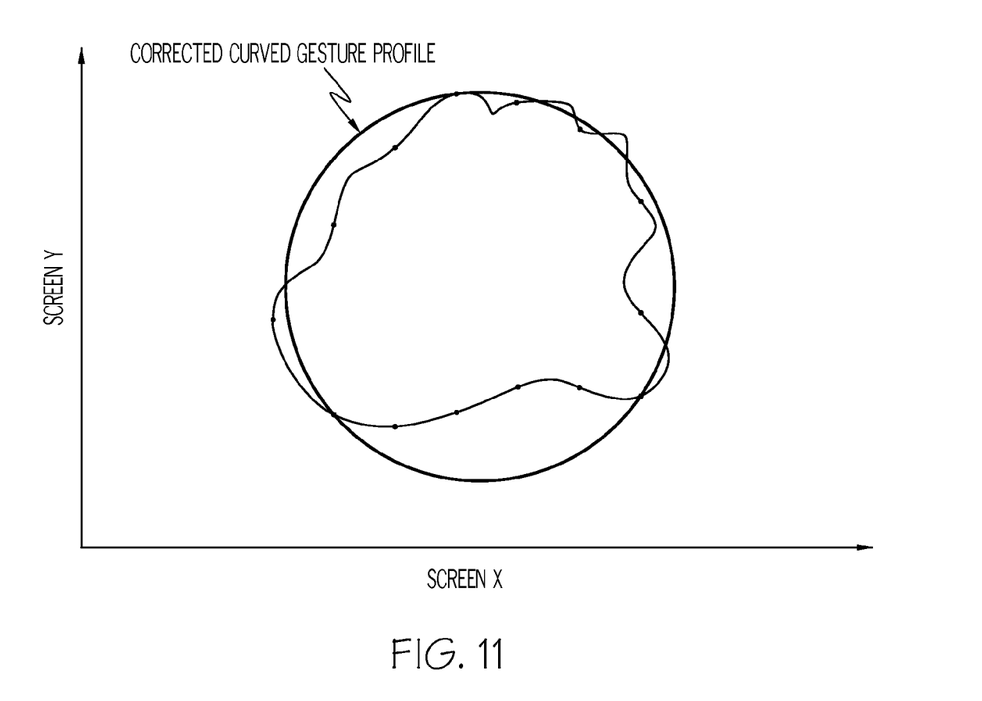

Whether the instantaneous gesture profile is LINEAR or CURVED, the maximum lateral error value of the computed intermediate gesture profile is determined (512, 522). This value is then compared to a threshold error value (Te) (514, 524). If this value is greater than the threshold error value, then the sub-segment of this computed intermediate gesture profile having this maximum error is again processed to further correct irregularities and minimize the lateral error (516, 526). If, however, the maximum lateral error value is less than the threshold value (Te), then the intermediate computed gesture profile is supplied to the gesture recognizer (528). Examples of corrected LATERAL and CURVED gesture profiles are depicted in FIGS. 10 and 11, respectively.

Figure 13:
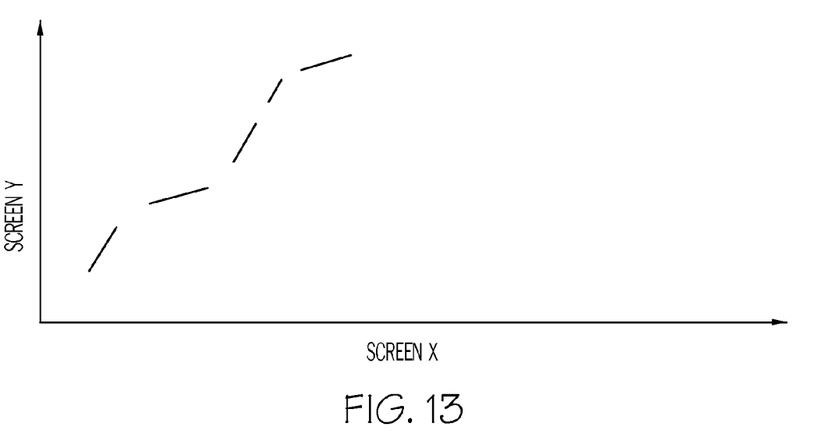
FIGS. 13-15 graphically depict vertical gesture profile correction as applied to a linear input gesture.
Figure 16:
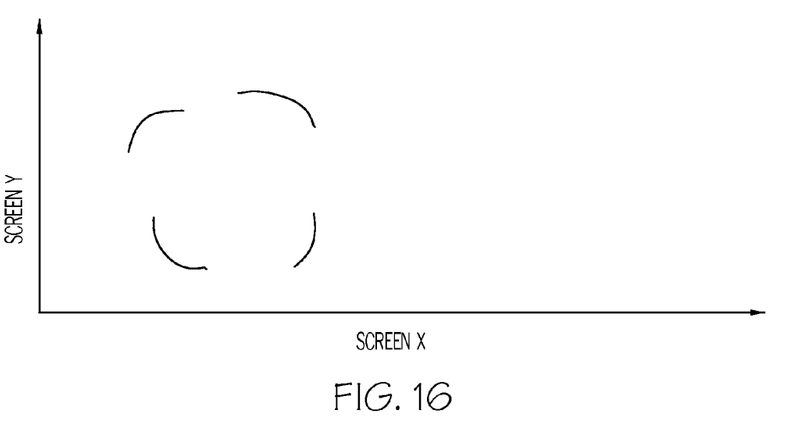
FIGS. 16-18 graphically depict vertical gesture profile correction as applied to a curved input gesture.

Returning now to FIG. 4, if the instability descriptor supplied from the instability detector 106 is VERTICAL, then the adaptive gesture corrector 112 will implement VGPC to correct irregularities in the input gesture signal caused by vertical instabilities. As depicted in FIGS. 13 and 16, vertical instabilities in the vehicle platform can cause missing gesture profile segments. The VGPC process predicts and fills in the missing segments in the input gesture profile and recovers the continuity of the gesture-based input command.

Figure 12:
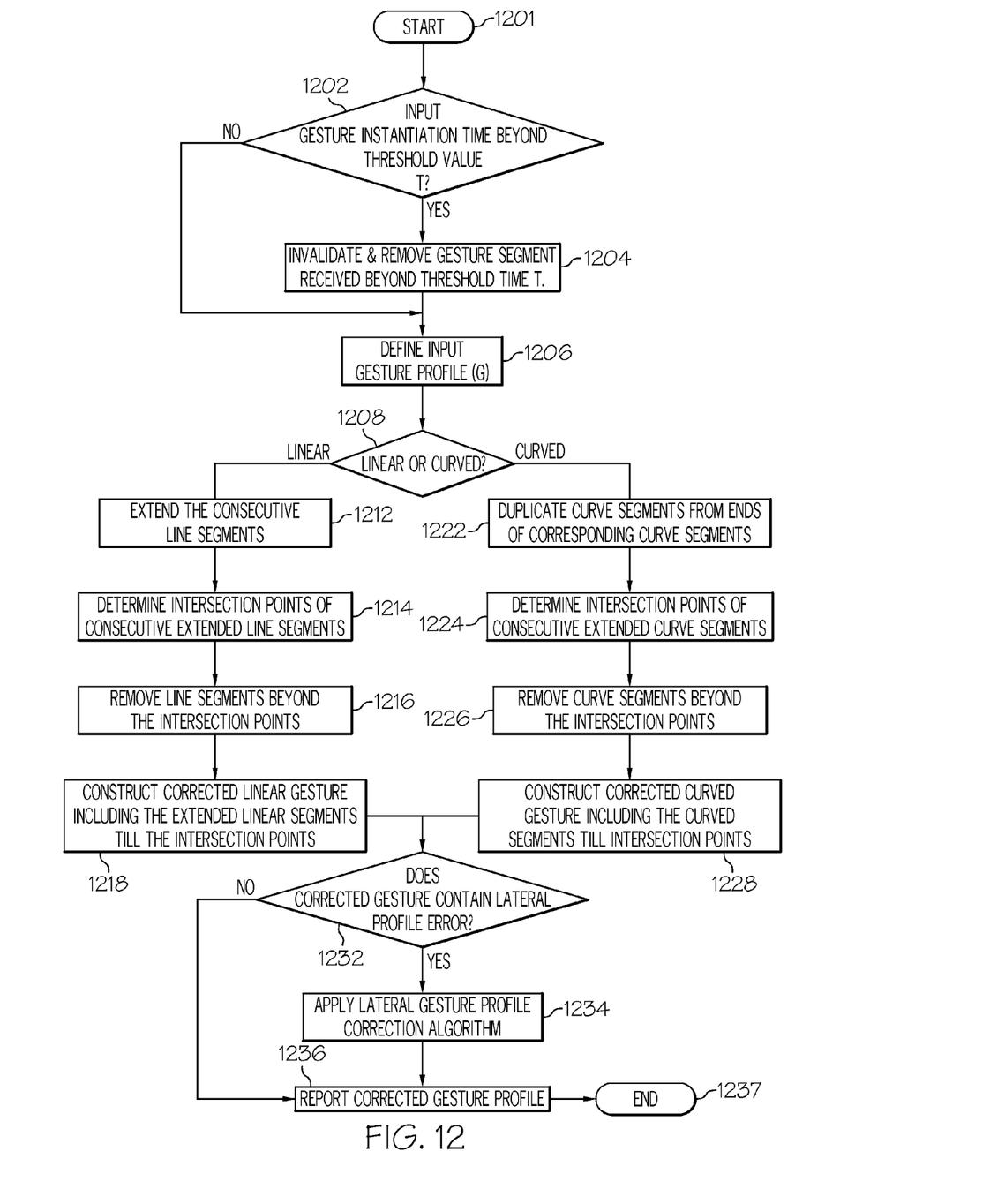
FIG. 12 depicts a process, in flowchart form, implemented by a portion of the system of FIG. 1 for implementing vertical gesture profile correction.

With reference now to FIG. 12, which depicts the VGPC process in flowchart form, it is seen that the VGPC assumes that consecutive gesture segments are received within an acceptable interval of time for these segments to be valid portions of an input gesture profile (1202), otherwise the input is invalidated and removed (1204) and no further processing on such temporally invalid gesture profile segments is invoked. If, however, the consecutive gesture segments are valid, the adaptive gesture corrector 112 implements the same process steps as the LGPC to define the input gesture profile (G) (1206), and to determine if the input gesture profile is LINEAR or CURVED (1208). As such, the description of these process steps will not be repeated.

Figure 14:
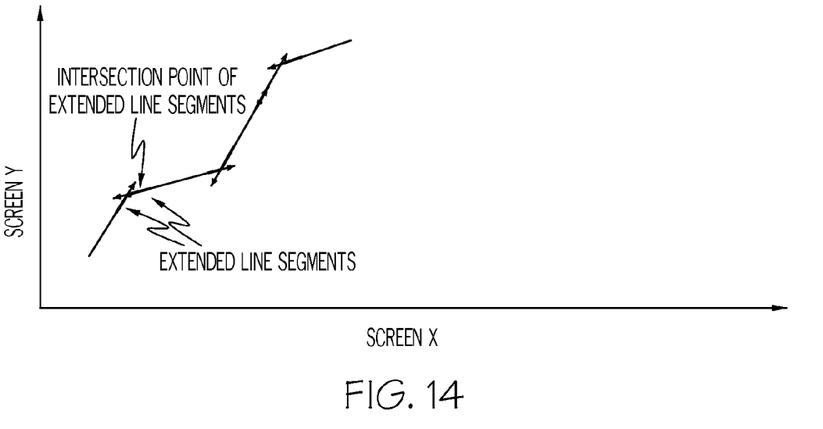
Figure 15:
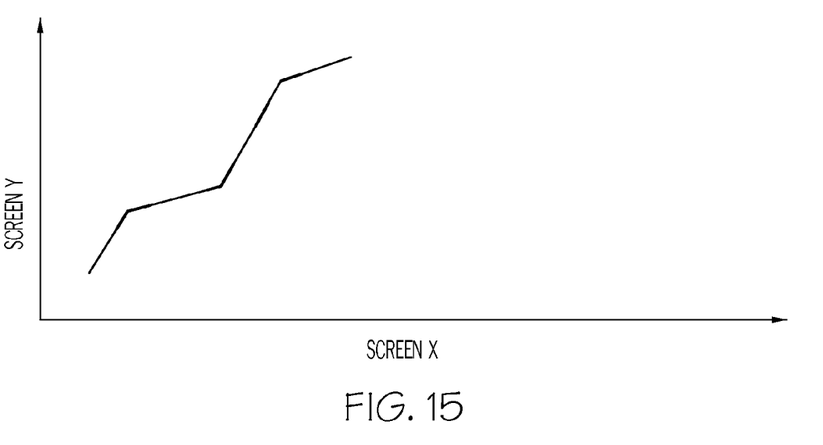

Referring now to FIGS. 13-15 together with FIG. 12, if the input gesture profile is LINEAR, then individual line segments of the input gesture are extended in both directions (1212), the intersection points of the extended line segments are computed (1214), and the line segments beyond these intersection points are clipped (1216). The resultant gesture profile is thus generated (1218), and is continuous with all missing segments filled in with the extrapolated gesture segments.

Figure 17:
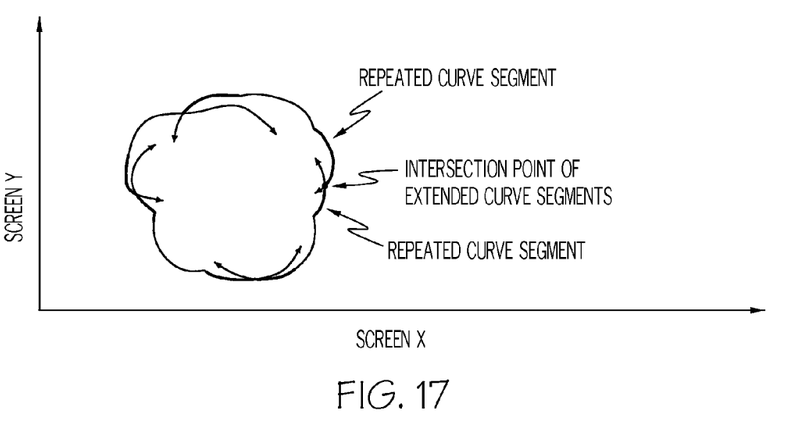
Figure 18:
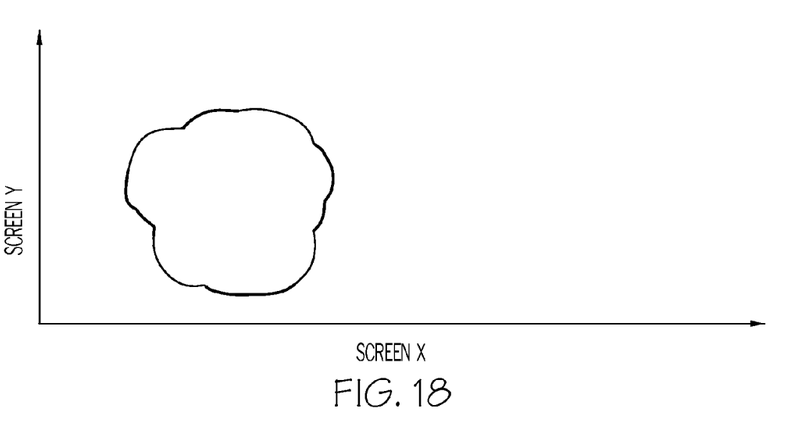

Referring to FIGS. 16-18 together with FIG. 12, if the input gesture profile is CURVED, then each individual curved segment is conjoined to both the ends of that curved segment (1222), the intersection points of the extended curved segments of consecutive input curved segments are computed (1224), and the curved segments beyond each intersection points are clipped (1226). The resultant gesture profile is thus generated (1228), and is a continuous curved gesture profile.

Figure 19:
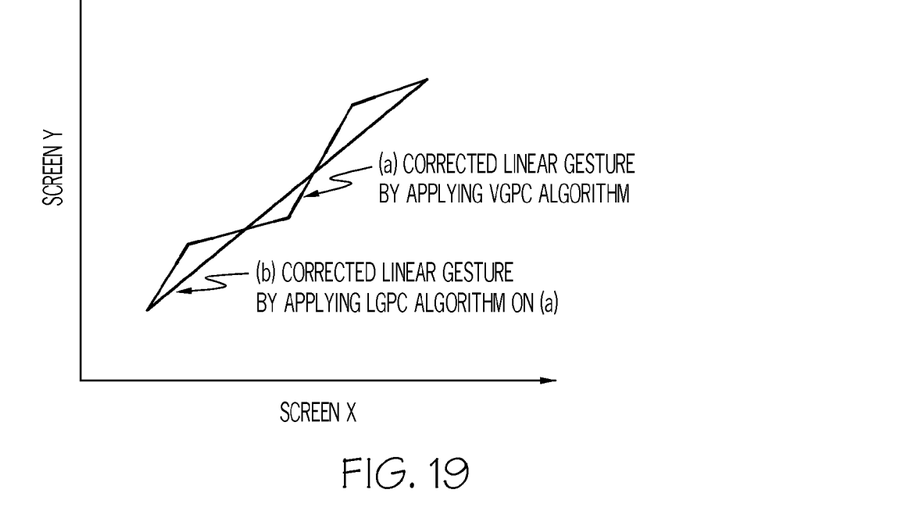
FIGS. 19 and 20 graphically depict lateral gesture profile correction applied linear and curved input gestures, respectively, that have had vertical gesture profile correction applied thereto.
Figure 20:
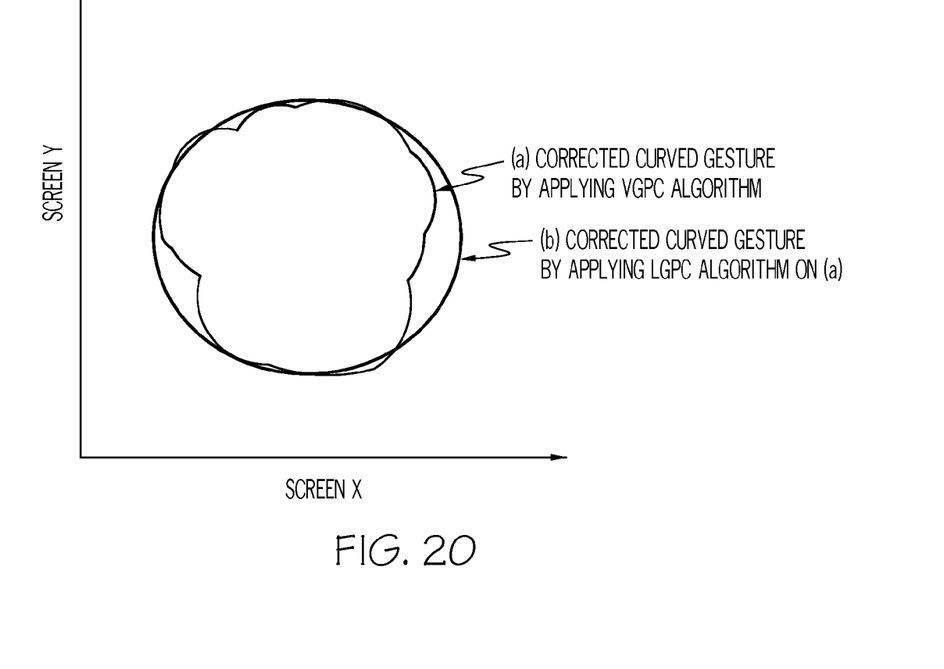

As FIG. 12 further depicts, if the corrected gesture profile contains lateral error, then the LGPC process depicted in FIG. 6 and described above, is applied to provide further profile corrections (1232, 1234). Some examples of this are depicted in FIGS. 19 and 20. In either case, the corrected gesture profile is then supplied to the gesture recognizer 114 (1236).

As was noted above, the term "instability" also encompasses user-related instabilities caused by, for example, fatigue and/or increased workload. In such embodiments, the instability detector 106 is configured to detect user-related instabilities. To do so, the instability detector 106 is implemented using one or more brain activity sensors, such as electroencephalogram (EEG) sensors, magnetic resonance imaging (MRI) sensors, just to name a few. No matter its specific implementation, the brain activity sensors are configured to sense brain activity of the user 110 and, using any one of numerous processes known in the art, process these signals to determine cognitive workload and performance values supply cognitive workload and performance values. If the cognitive workload and performance values exceed predetermined threshold values, the processor 104, and more specifically the adaptive gesture corrector 112, will implement both LGPC and VGPC, as described above.

Figure 21:
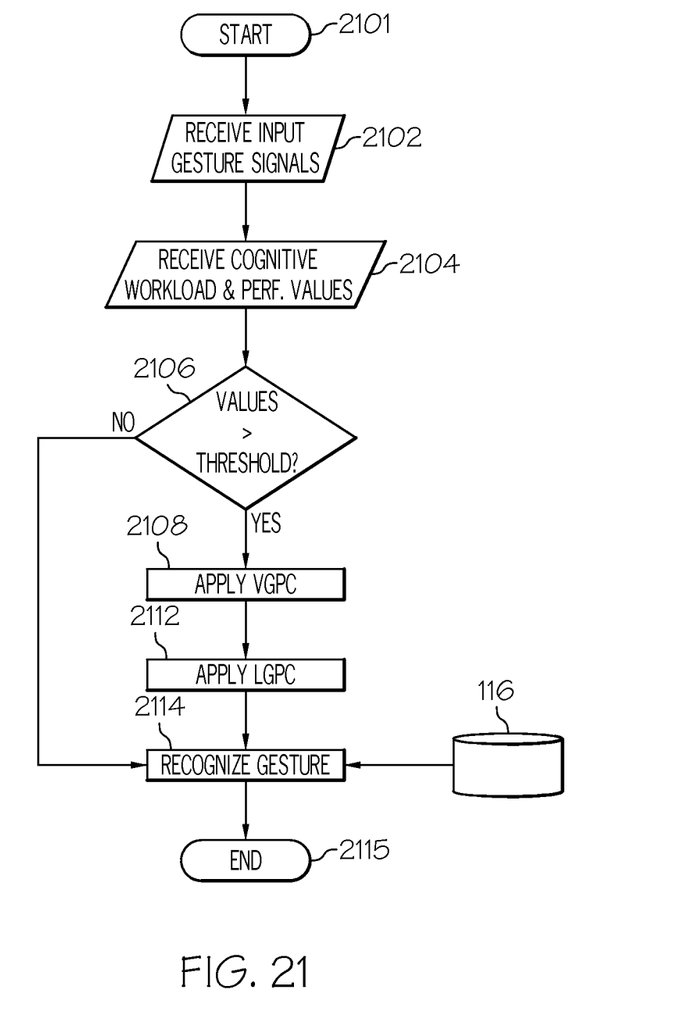
FIG. 21 depicts an alternate process, in flowchart form, implemented by a portion of the system of FIG. 1 for implementing input gesture correction.

With the embodiment described above, the instability detector 106 does not supply instability descriptors. As such, the adaptive gesture corrector 112 is not configured to receive instability descriptors nor determine the whether the instability descriptor is NULL, LATERAL, VERTICAL, or BOTH. Rather, as depicted in FIG. 21, the adaptive gesture corrector 112 receives both the input gesture signals (2102) and the cognitive workload and performance values (2104. The adaptive gesture corrector 112 compares the cognitive workload and performance values to the predetermined threshold values (2106). If the cognitive workload and performance values do not exceed the predetermined threshold values, the input gesture signal is sent directly to the gesture recognizer 114 (2114). If, however, the cognitive workload and performance values do exceed the predetermined threshold values, the adaptive gesture corrector 112 applies both VGPC (2108) and LGPC (2112).

Figure 22:
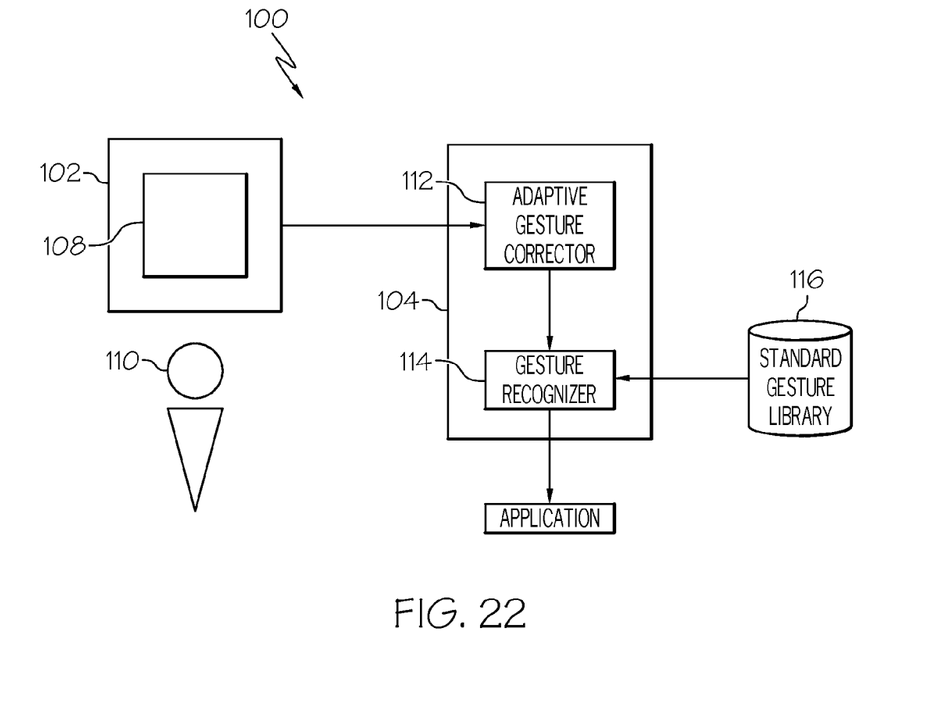
FIG. 22 depicts a functional block diagram of another embodiment of a system to correct irregularities and discontinuities in gesture-based input commands.

In yet another embodiment, which is depicted in FIG. 22, the system 100 is depicted without any instability detector. With this embodiment, both LGPC and VGPC are applied unconditionally. This embodiment may be implemented if it is desirable to continuously correct the gesture-based input commands.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gesture-based touch screen display system, comprising:
   a touch screen display including at least a touch sensitive region, the touch sensitive region adapted to receive gesture-based input commands from a user, the touch sensitive region configured, upon receipt of the gesture-based input commands, to generate gesture signals representative of the gesture-based input commands;
   an instability detector configured to detect when at least one of the touch screen display or the user is being subjected to an acceleration having a magnitude and a direction and, upon such detection, to supply instability descriptors representative of the detected acceleration; and
   a processor coupled to receive the gesture signals and the instability descriptors, the processor configured, upon receipt of the gesture signals and the instability descriptors, to (i) determine if the instability descriptor is representative of a lateral acceleration, a vertical acceleration, or both, (ii) selectively apply lateral corrections, vertical corrections, or both to the gesture-based input commands based upon the instability descriptors,
   wherein the processor is configured to selectively apply vertical corrections by:
      determining if consecutive gesture segments are received within a predetermined interval of time;
      discarding the gesture-based input command if consecutive gesture segments are not received within a predetermined interval of time; and
      if the consecutive gesture segments are received within a predetermined interval of time:
         sampling the gesture-based input command to define an input gesture profile; and
         determining whether the input gesture profile represents a linear gesture profile or a curved gesture profile.

2. The system of claim 1, wherein, if the processor determines the input gesture profile represents a linear gesture profile, the processor is further configured to:
   extend individual lines segments of the input gesture profile;
   compute intersection points of the individual line segments; and
   clip line segments that extend beyond the intersection points.

3. The system of claim 1, wherein, if the processor determines the input gesture profile represents a curved gesture profile, the processor is further configured to:
   conjoin both ends of individual curved segments;
   compute intersection points of extended, consecutive curved segments; and
   clip curved segments beyond each intersection points.

4. A gesture-based touch screen display system, comprising:
   a touch screen display including at least a touch sensitive region, the touch sensitive region adapted to receive gesture-based input commands from a user, the touch sensitive region configured, upon receipt of the gesture-based input commands, to generate gesture signals representative of the gesture-based input commands;
   an instability detector configured to detect when at least one of the touch screen display or the user is being subjected to an acceleration having a magnitude and a direction and, upon such detection, to supply instability descriptors representative of the detected acceleration; and
   a processor coupled to receive the gesture signals and the instability descriptors, the processor configured, upon receipt of the gesture signals and the instability descriptors, to (i) determine if the instability descriptor is representative of a lateral acceleration, a vertical acceleration, or both, (ii) selectively apply lateral corrections, vertical corrections, or both to the gesture-based input commands based upon the instability descriptors,
   wherein the processor is configured to selectively apply lateral corrections by:
      sampling the gesture-based input command to define an input gesture profile;

determining whether the input gesture profile represents a linear gesture profile or a curved gesture profile; and implementing an iterative lateral error minimization process to iteratively minimize lateral errors in intermediately corrected gesture profiles.

5. A gesture-based touch screen display system, comprising:

a touch screen display including at least a touch sensitive region, the touch sensitive region adapted to receive gesture-based input commands from a user, the touch sensitive region configured, upon receipt of the gesture-based input commands, to generate gesture signals representative of the gesture-based input commands;

an instability detector configured to detect brain activity; and a processor coupled to receive the gesture signals and the detected brain activity, the processor configured, upon receipt of the gesture signals and the detected brain activity, to (i) correlate the detected brain activity to cognitive workload and performance values of the user and (ii) selectively apply both lateral corrections and vertical corrections to the gesture-based input commands.

* * * * *